US011284230B1

(12) United States Patent
Fang et al.

(10) Patent No.: US 11,284,230 B1
(45) Date of Patent: Mar. 22, 2022

(54) METHOD OF SENSING-DATA COLLECTION AND TRANSPORT AT REMOTE RADIO HEAD

(71) Applicant: T-MOBILE INNOVATIONS LLC, Overland Park, KS (US)

(72) Inventors: Zheng Fang, McLean, VA (US); Matthew J. Starzec, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 192 days.

(21) Appl. No.: 16/573,782

(22) Filed: Sep. 17, 2019

(51) Int. Cl.
*H04W 4/38* (2018.01)
*H04W 88/08* (2009.01)
*H04B 10/2575* (2013.01)

(52) U.S. Cl.
CPC ........... *H04W 4/38* (2018.02); *H04W 88/085* (2013.01); *H04B 10/25753* (2013.01)

(58) Field of Classification Search
CPC . H04W 4/38; H04W 88/085; H04B 10/25753
See application file for complete search history.

(56) References Cited

U.S. PATENT DOCUMENTS

| 8,830,968 | B2 | 9/2014 | Lin et al. |
| 9,912,547 | B1 | 3/2018 | Douberley et al. |
| 2017/0059717 | A1* | 3/2017 | Polehn .................... G01S 19/48 |
| 2018/0070254 | A1* | 3/2018 | Hannan .............. H04B 17/0085 |
| 2019/0007246 | A1 | 1/2019 | Fertonani et al. |
| 2019/0379468 | A1* | 12/2019 | Roessel ................. H04W 24/10 |
| 2020/0213940 | A1* | 7/2020 | Gandhi ............. H04W 52/0206 |
| 2021/0058194 | A1* | 2/2021 | Nilsson ................. H04W 80/02 |

FOREIGN PATENT DOCUMENTS

WO 2014018052 A1 1/2014

OTHER PUBLICATIONS

Lee, Yann-Hang, et al., "A Smart Gateway Framework for IOT Services", IEEE.org, 2016 IEEE International COnference on Internet of Things (iThings), Dec. 2016, retrieved Mar. 18, 2019 https://ieeeexplore.ieee.org/document/7917072.
Ejaz, Waleed, et al., "Internet of Things (IoT) in 5G Wireless Communiations" Guest Editorial, IEEE Access Digital Object Identifier 10.1109/Access 2016.2646120. vol. 4, 2016.

* cited by examiner

*Primary Examiner* — Pao Sinkantarakorn
*Assistant Examiner* — Kabir U Jahangir

(57) ABSTRACT

A system for sensing an environmental parameter at a cell site of a cellular communication network and transporting corresponding data over an operations and maintenance ("O&M") channel of the cellular communication network comprises a remote radio head and a sensor operably coupled to the remote radio head to receive electrical power from the remote radio head and transmit sensor data corresponding to the environmental parameter to the remote radio head. The sensor is operable to use at least some of the electrical power to generate the sensor data and is operable to use at least some of the electrical power to transmit the sensor data to the remote radio head. The remote radio head is operable to provide the electrical power to the sensor, is operable to receive the sensor data, and is operable to transmit operations and maintenance data and the sensor data over the O&M channel.

19 Claims, 11 Drawing Sheets

US 11,284,230 B1

METHOD OF SENSING-DATA COLLECTION AND TRANSPORT AT REMOTE RADIO HEAD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A cellular communication network typically includes a plurality of cell sites. A cell site may include: a tower, a mast, or other tall structure; an antenna located atop (or practically atop) the tall structure; and a remote radio head ("RRH") located near the antenna. In general, a conventional RHH is a transceiver component that: (1) receives (through a physical "fronthaul" path; over a primary logical communication channel) baseband data from a baseband unit ("BBU") or a base station server ("BSS"), converts the baseband data into radio frequency ("RF") signals, and transmits the RF signals to/through the antenna; (2) receives RF signals through the antenna, converts the RF signals into baseband data, transmits the baseband data (through the fronthaul; over the primary logical communication channel) to the BBU or the BSS; (3) receives (through the fronthaul) operational control commands/settings ("operations data") from the BBU or the BSS over a secondary logical communication channel (referenced herein as an "operations and maintenance channel," "operation and management channel," or "O&M channel"); and (4) transmits (through the fronthaul; over the O&M channel) component health/status data ("maintenance data") to the BBU or BSS. The RRH may be powered through a fairly low-voltage (e.g., 48V direct current ("DC")) supply line that runs to the RRH from a corresponding power supply.

SUMMARY

In an embodiment, a system for sensing an environmental parameter at a cell site of a cellular communication network and transporting corresponding data over an O&M channel of the cellular communication network is disclosed. The system comprises a remote radio head and a sensor operably coupled to the remote radio head to receive electrical power from the remote radio head and transmit sensor data corresponding to the environmental parameter to the remote radio head. The sensor is operable to use at least some of the electrical power to generate the sensor data and is operable to use at least some of the electrical power to transmit the sensor data to the remote radio head. The remote radio head is operable to provide the electrical power to the sensor, is operable to receive the sensor data, and is operable to transmit operations and maintenance data and the sensor data over the O&M channel.

In another embodiment, a method for sensing an environmental parameter at a cell site of a cellular communication network and transporting corresponding data over an O&M channel of the cellular communication network is disclosed. The method comprises receiving electrical power provided by a remote radio head. The method also comprises generating, using at least some of the electrical power, sensor data corresponding to the environmental parameter. The method also comprises transmitting, using at least some of the electrical power, the sensor data to the remote radio head. The method also comprises transmitting, from the remote radio head, over the O&M channel, operations and maintenance data and the sensor data.

In another embodiment, a method for sensing an environmental parameter at a cell site of a cellular communication network and transporting corresponding data to a core network of the cellular communication network over an O&M channel of the cellular communication network is disclosed. The method comprises generating, using an Internet of Things sensor attached to a remote radio head, sensor data corresponding to the environmental parameter. The method also comprises wirelessly transmitting the sensor data from the Internet of Things sensor to a communication gateway module coupled to the remote radio head. The method also comprises transmitting the sensor data from the communication gateway module to the core network over the O&M channel.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
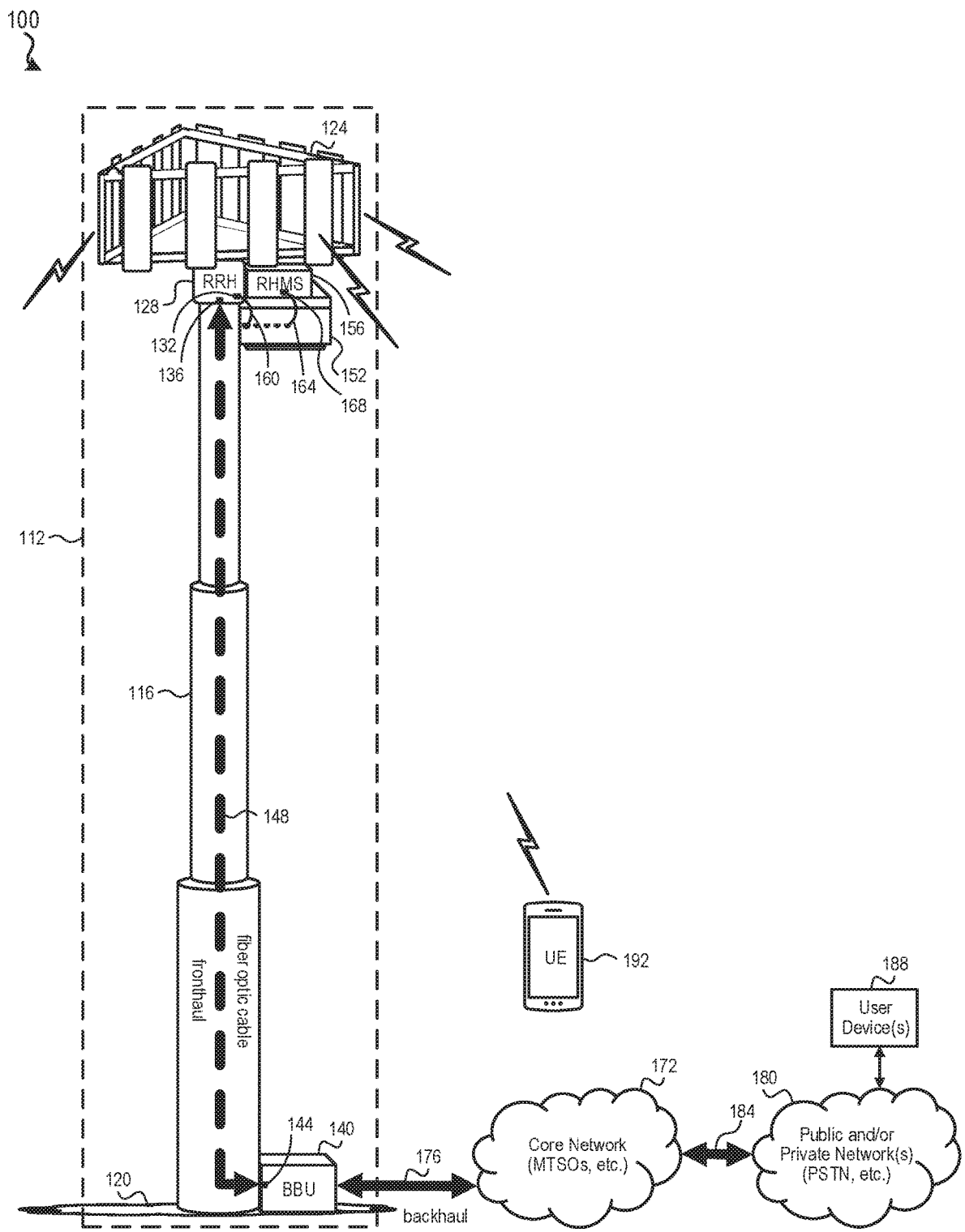
FIG. 1 depicts a cell-site monitoring system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A conventional cell site provides high vantage points, at or near its RRH. It is a teaching of the present disclosure that the physical structure supporting the RRH—for example a mast, a tower, a top of a building—may be recruited to secure sensors for monitoring the surrounding environment. Moreover, as cellular communication coverage continues to grow and technologies continue to develop from third generation ("3G") to fifth generation ("5G") (and beyond), sophisticated offerings such as weather reporting and forecasting, public safety alerts and information, traffic information, and others are becoming increasingly desirable to consumers of cellular communication services. Such offerings are increasingly dependent on data from various sensors embedded in Internet of Things ("IoT") devices. Non-limiting examples of such sensors include accelerometers, gyroscopes, photometers, proximity sensors, fingerprint readers, cameras, microphones, magnetometers, temperature sensors, humidity sensors, pressure sensors, wind speed sensors, water level sensors, natural gas ("CH4") concentration sensors, carbon dioxide ("$CO_2$") concentration sensors, ozone ("$O_3$") concentration sensors, volatile organic chemical ("VOC") concentration sensors, light sensors, and particulate matter level sensors. As the number of such sensors deployed around the world grows, reliably acquiring and transporting the ever increasing amounts of corresponding sensor data into and through cellular communication networks is becoming more and more challenging.

Meanwhile, most conventional cellular communication networks have been designed to support at least a modicum of operations and maintenance ("O&M") functions. In the context of a communications network, O&M functions are generally directed to remotely administering/controlling and monitoring various network components. Conventional cellular communication networks typically support O&M communications over respective dedicated O&M communications channels. The bandwidths of such channels are typically underutilized. The inventors have recognized, among other things, that many O&M channels may have enough bandwidth to also transport (in addition to operations and maintenance data) considerable amounts of environmental sensor data-without bogging down the transport of higher priority voice and data communications on other channels.

In various embodiments according to the disclosure, one or more environmental sensors are imbedded in a module that plugs into or otherwise attaches to a RRH. In some embodiments, one or more of such sensors comprises an IoT device that wirelessly communicates with a gateway module coupled to the RRH. The sensor(s) may receive electrical operating power from the RRH, sense one or more environmental parameters, and communicate sensor data corresponding to the environmental parameter(s) to the remote radio head. The remote radio head may provide the electrical power to the sensor(s), receive the sensor data, and communicate the sensor data, over an O&M channel, to a core network of a cellular communication network. The sensor data may flow from the RRH to a BBU (through a fronthaul) over the O&M channel. The BBU may use some or all of the sensor data locally, and may send some or all of the data (through a backhaul) to the core network. The core network may provide sensing as a network service ("SAaNS") that processes the data and makes the data and/or the processed data available to one or more users of the SAaNS. It should be appreciated that such disclosed embodiments may avoid data transport latency challenges that could be experienced with a dedicated air communication link. Additional advantages include constantly powered sensors (without a need for batteries in the sensors), ease of sensor deployment (with little or no additional zoning or leasing issues), scalable sensor deployment, and capabilities to dynamically enable, disable, and/or reconfigure the sensors.

Non-limiting examples of additional potential applications include air traffic control of drones, sensing of the presence of explosives, fire, or other hazardous materials/conditions and generating corresponding local/on-site alarms, and determining local/on-site weather conditions and reporting them to remote SAaNS users. Another application may sense RF noise levels from three cellular communication sectors and dynamically adjust the beam width and angle of each sector's radio antenna so as to join their capabilities, for providing more reliable cellular service transmissions to a cluster of user equipment located in a sector with high noise levels. Another application may facilitate user equipment located in one sector sending its uplink traffic to another sector in view of a high RF noise level in the sector in which it is located.

As used herein, the term "communicate" and inflections thereof mean to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device. Also, a "module" or "unit" as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, "computer executable instructions" may be in any form including, but not limited to, machine code, assembly code, scripts, and high-level programming code written in any programming language.

FIG. 1 depicts a cell-site monitoring system 100 according to an embodiment of the disclosure. It should be appreciated that the system 100 and/or one or more components thereof may be configured to, among other things, perform one or more steps of the method 1000 (see FIG. 10) for cell-site monitoring according to an embodiment of the disclosure. The system 100 includes a cell site 112. The cell site 112 includes a tall structure 116. In the illustrated system 100, the structure 116 comprises a tower. In other embodiments, the structure 116 may comprise a mast, a building, or any other suitable structure. The structure 116 extends upwardly and approximately vertically from a ground level 120 to a height of about 150 feet above the ground level 120. The cell site 112 also includes an array antenna 124. The array antenna 124 is located atop the structure 116.

The cell site 112 also includes a remote radio head ("RRH") 128. The RRH 128 is attached to the structure 116 such that the RRH 128 is located at least 100 feet above the ground level 120 and not more than 25 feet away from the array antenna 124. The RRH 128 includes an Institute of Electrical and Electronics Engineers ("IEEE") 802.3at compliant power-sourcing Ethernet ("PoE+") port 132 and an optical port 136. The RRH 128 is configured to provide, among other things, a communication gateway between the PoE+ port 132 and the optical port 136. In the illustrated system 100, the RRH 128 comprises a suitably configured or modified AxxceLTE™ Remote Radio Head (which has been marketed, at http://www.axxcelera.com/product_item_detail.php?id=3070, by Axxcelera Broadband Wireless) (a copy of this web page has been archived on the Wayback Machine, https://web.archive.org/). Accordingly, in the illustrated system 100, the PoE+ port 132 comprises the RJ45-type PoE+ port of the AxxceLTE™ Remote Radio Head, and the optical port 136 comprises one of the Common Public Radio Interface ("CPRI") ports of the of the AxxceLTE™ Remote Radio Head. In other embodiments, the RRH 128 (including the PoE+ port 132 and the optical port 136) may comprise any other suitably configured commercially available or specially manufactured device or equipment.

The cell site 112 also includes a baseband unit ("BBU") 140. The BBU 140 includes an optical port 144. The cell site 112 also includes a fiber-optic-cable-based fronthaul 148. The fiber-optic-cable-based fronthaul 148 is suitable to support CPRI communication and/or Open Base Station Architecture Initiative ("OBSAI") communication, and extends between the optical port 136 (of the RRH 128) and the optical port 144 (of the BBU 140) to operably couple the RRH 128 to the BBU 140 in a known manner. In the illustrated system 100, the RRH 128 and the BBU 140 are configured to communicate with each other over an O&M channel according to the CPRI protocol. In other embodiments, the RRH 128 and the BBU 140 may be configured to communicate with each other over an O&M channel according to the OBSAI protocol. In other embodiments, the fiber-optic-cable-based fronthaul 148 may support any suitable alternative communication protocol(s), and the RRH 128 and the BBU 140 may be configured to communicate with each other according to such protocol(s). In other embodiments, the fiber-optic-cable-based fronthaul 148 may be replaced with a coaxial-cable-based fronthaul, a wireless-communication-based fronthaul, and/or any other suitable alternative fronthaul implementation that supports CPRI, OBSAI, and/or any other suitable alternative communication protocol(s), and the RRH 128 and the BBU 140 may be configured to communicatively couple to any such fronthaul and communicate with each other according to any such protocol(s).

The system 100 also includes a Power Over Ethernet ("PoE") passthrough switch 152, a PoE non-wirelessly-communicative radio-head-mounted sensor ("PoE RHMS") 156, an Ethernet cable 160, and an Ethernet cable 164. The PoE RHMS 156 includes an RJ45-type IEEE 802.3af compliant PoE power-receiving Ethernet port 168. The Ethernet cable 160 operably couples the PoE+ port 132 (of the RRH 128) to the switch 152 in a known manner. The Ethernet cable 164 operably couples the switch 152 to the Ethernet port 168 (of the PoE RHMS 156) in a known manner. In the illustrated system 100, the switch 152 comprises a Nano-Switch™ Model N-SW Outdoor 4-Port PoE Passthrough Switch (which has been marketed by Ubiquiti Networks, Inc., at https://www.ui.com/accessories/nanoswitch/) (a copy of this web page has been archived on the Wayback Machine, https://web.archive.org/). In other embodiments, the switch 152 may comprise any other suitable commercially available or specially manufactured device or equipment. It should be appreciated, then, that as the RRH 128 provides (in addition to conventional remote radio head functionality) a communication gateway between the PoE+ port 132 (of the RRH 128) and the optical port 136 (of the RRH 128), the RRH 128 also provides a communication gateway between the PoE RHMS 156 and the BBU 140. The PoE RHMS 156 is described further below (see, e.g., FIG. 3).

The system 100 also includes a core network 172 (e.g., a mobile telephone switching office ("MTSO")) and a backhaul 176. The backhaul 176 operably couples the BBU 140 to the core network 172 in a known manner.

The system 100 also includes one or more public and/or private networks 180 (e.g., the public switched telephone network ("PSTN"), the Internet, private enterprise networks, home networks, etc.) and one or more additional communication links 184. The one or more additional communication links 184 operably couple the core network 172 to the one or more public and/or private networks 180 in a known manner.

The system 100 also includes one or more non-cellular-communicative user devices 188. Each of the devices 188 is any type of electronic device that may be used by a user to interact with the one or more public and/or private networks 180 without necessarily doing so through the core network 172. Non-limiting examples of the user devices 188 include plain old telephone system devices, digital subscriber line ("DSL") telephone system devices, and internet protocol ("IP") communicative computers and terminals.

The system 100 also includes one or more items of cellular-communicative user equipment ("UE") 192. In some instances, one of the UE 192 may be referred to herein as a cellular communication device 192 or a mobile communication device 192. Each of the UE 192 is configured to wirelessly communicate with the cell site 112 according to one or more of a long term evolution ("LTE"), code division multiple access ("CDMA"), global system for mobile communication ("GSM"), worldwide interoperability for microwave access ("WiMAX") telecommunication, and/or other suitable telecommunication protocol(s). Non-limiting examples of the UE 192 include a mobile phone, a smart phone, a personal digital assistant ("PDA"), a wearable computer, a headset computer, a laptop computer, a tablet computer, or a notebook computer. The cell site 112 and the backhaul 176 may together operably couple one or more of the UE 192 to the core network 172. Other embodiments of the system 100 may comprise any number of the cell site 112, any number of the backhaul 176, and any number of the UE 192.

Figure 2:
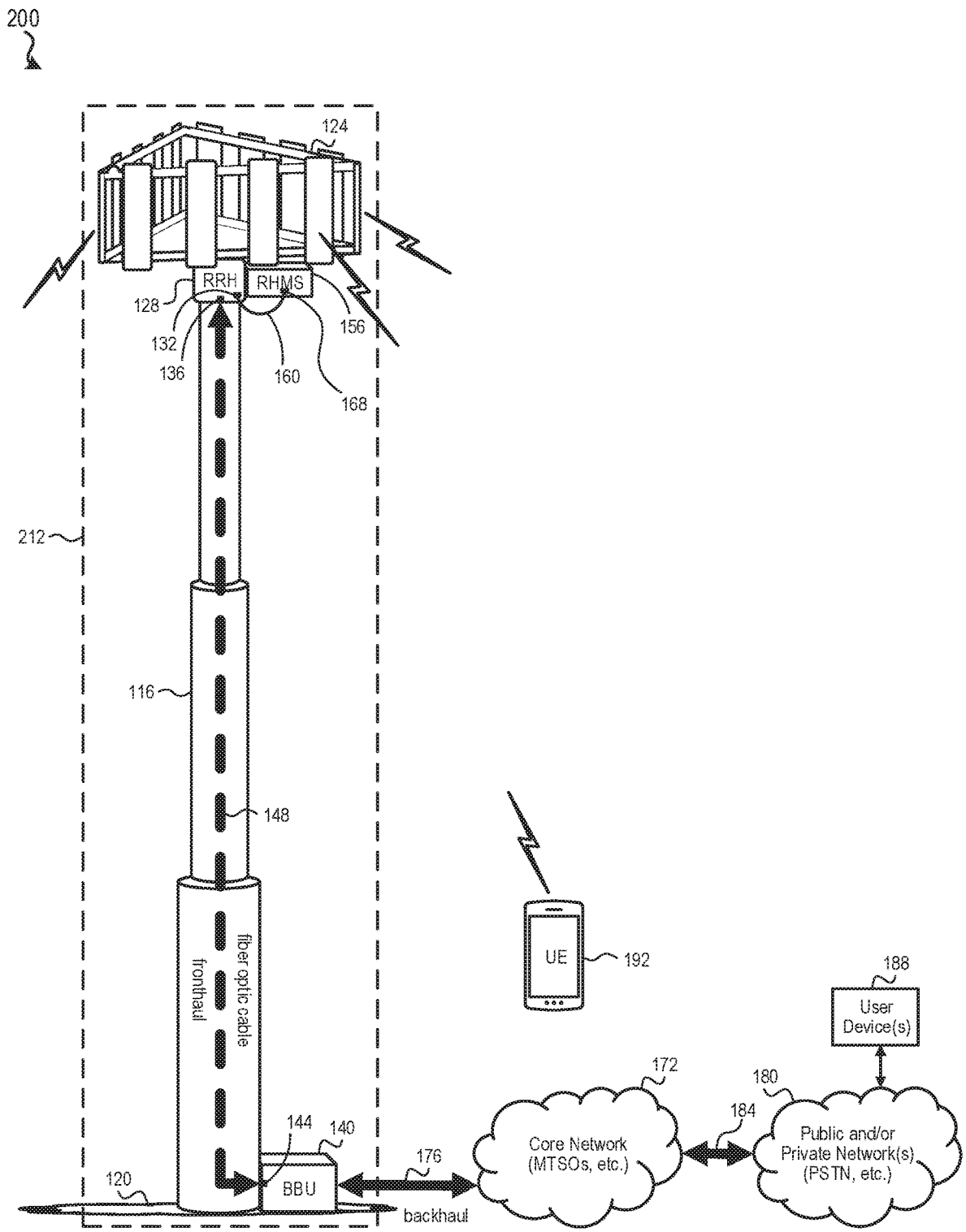
FIG. 2 depicts a cell-site monitoring system according to another embodiment of the disclosure.

FIG. 2 depicts a cell-site monitoring system 200 according to another embodiment of the disclosure. It should be appreciated that the system 200 and/or one or more components thereof may be configured to, among other things, perform one or more steps of the method 1000 (see FIG. 10) for cell-site monitoring according to an embodiment of the disclosure. The system 200 is configured like the system 100 (described above in connection with FIG. 1), except that the system 200 includes an alternative cell site 212 (rather than the cell site 112), wherefrom the switch 152 is omitted and, instead, the Ethernet cable 160 operably couples the RRH 128 directly to the PoE RHMS 156.

Figure 3:
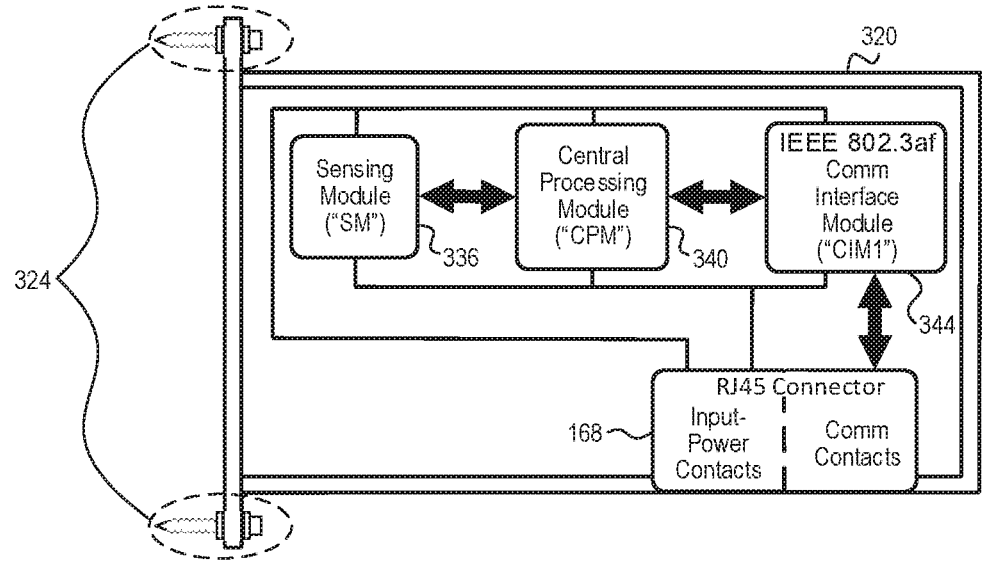
FIG. 3 depicts a layout for a PoE non-wirelessly-communicative radio-head-mounted sensor according to an embodiment of the disclosure.

FIG. 3 depicts a layout for the PoE RHMS 156 according to an embodiment of the disclosure. It should be appreciated that the PoE RHMS 156 and/or one or more components thereof may be configured to, among other things, perform one or more steps of the method 1000 (see FIG. 10) for cell-site monitoring according to an embodiment of the disclosure. In some embodiments, the PoE RHMS 156 may be implemented as a suitable off-the-shelf, PoE-enabled, IoT device. In other embodiments, the PoE RHMS 156 may be implemented as described further herein and/or using any other suitable device or combination of devices. The PoE RHMS 156 includes: a housing 320; mounting hardware 324; the Ethernet port 168 (see also FIG. 1); a sensing module 336; a central processing module 340; and an IEEE 802.3af compliant communication interface module 344.

The housing 320 is configured to be securely attached to the RRH 128 (the RRH 128 is not depicted in FIG. 3, but see FIG. 1) by the mounting hardware 324. The housing 320 is also configured to meet or exceed National Electrical Manufacturers Association ("NEMA") level 4 electrical enclosure standards and to meet or exceed IEEE 1613 environmental and testing requirements. The housing 320 accommodates the Ethernet port 168, the sensing module 336, the central processing module 340, and the communication interface module 344 such that Ethernet port 168 may be operably coupled to the Ethernet cable 164 (the Ethernet cable 164 is not depicted in FIG. 3, but see FIG. 1) and such that the sensing module 336 may operably sense one or more environmental parameters.

The sensing module 336 is communicatively coupled to the central processing module 340. The central processing module 340 is communicatively coupled to the communication interface module 344. And the communication interface module 344 is communicatively coupled to the Ethernet port 168. Additionally, the sensing module 336, the central processing module 340, and the communication interface module 344 are operably coupled to the Ethernet port 168 to receive power through the Ethernet port 168 in accordance with IEEE 802.3af and are configured to operate using that power. It should be appreciated that, as IEEE 802.3at standards are backward compatible with IEEE 802.3af, the AxxceLTE™ Remote Radio Head (disclosed above in connection with the RRH 128, depicted in FIG. 1) can provide suitable operating power for the illustrated PoE RHMS 156. It should also be appreciated that the sensing module 336, the central processing module 340, the communication interface module 344, and the Ethernet port 168 may be implemented using an embodiment of the computer system 1180 (the computer system 1180 is not depicted in FIG. 3, but see FIG. 11). For example, in such embodiments the sensing module 336 may comprise a suitable one or more of the I/O devices 1190, the central processing module 340 may comprise a suitable one or more of the CPU 1182, the secondary storage 1184, the ROM 1186, and the RAM 1188, and the communication interface module 344 and the Ethernet port 168 may comprise a suitable one or more of the network connectivity devices 1192.

Figure 4:
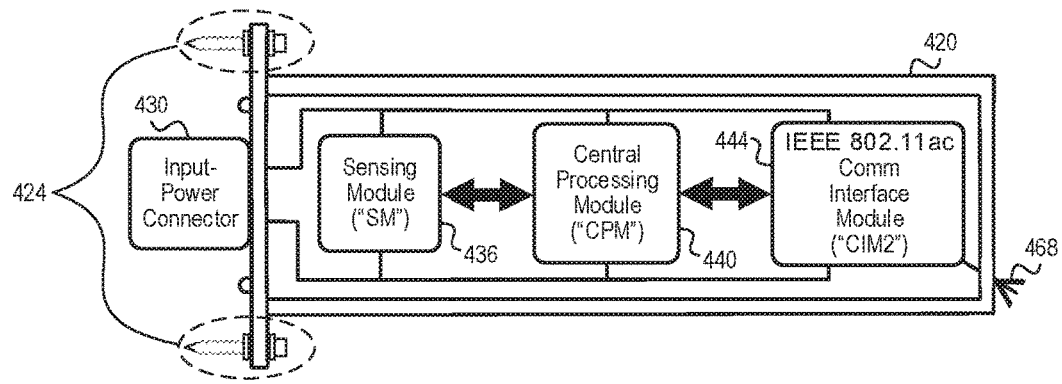
FIG. 4 depicts a layout for a Wi-Fi-communicative radio-head-mounted sensor according to an embodiment of the disclosure.

FIG. 4 depicts a layout for a Wi-Fi-communicative radio-head-mounted sensor ("Wi-Fi RHMS") 456 according to an embodiment of the disclosure. It should be appreciated that the Wi-Fi RHMS 456 and/or one or more components thereof may be configured to, among other things, perform one or more steps of the method 1000 (see FIG. 10) for cell-site monitoring according to an embodiment of the disclosure. In some embodiments, the Wi-Fi RHMS 456 may be implemented as a suitable off-the-shelf IoT (not necessarily PoE-enabled) device. In other embodiments, the Wi-Fi RHMS 456 may be implemented as described further herein and/or using any other suitable device or combination of devices. The Wi-Fi RHMS 456 includes: a housing 420; mounting hardware 424; an input-power connector 430; a sensing module 436; a central processing module 440; an IEEE 802.11ac compliant communication interface module 444; and a suitable antenna 468.

The housing 420 is configured to be securely attached to a RRH 528 (the RRH 528 is not depicted in FIG. 4, but see FIG. 5) by the mounting hardware 424. The housing 420 is also configured to meet or exceed National Electrical Manufacturers Association ("NEMA") level 4 electrical enclosure standards and to meet or exceed IEEE 1613 environmental and testing requirements. The housing 420 accommodates the sensing module 436, the central processing module 440, and the communication interface module 444 such that the sensing module 436 may operably sense one or more environmental parameters.

Figure 5:
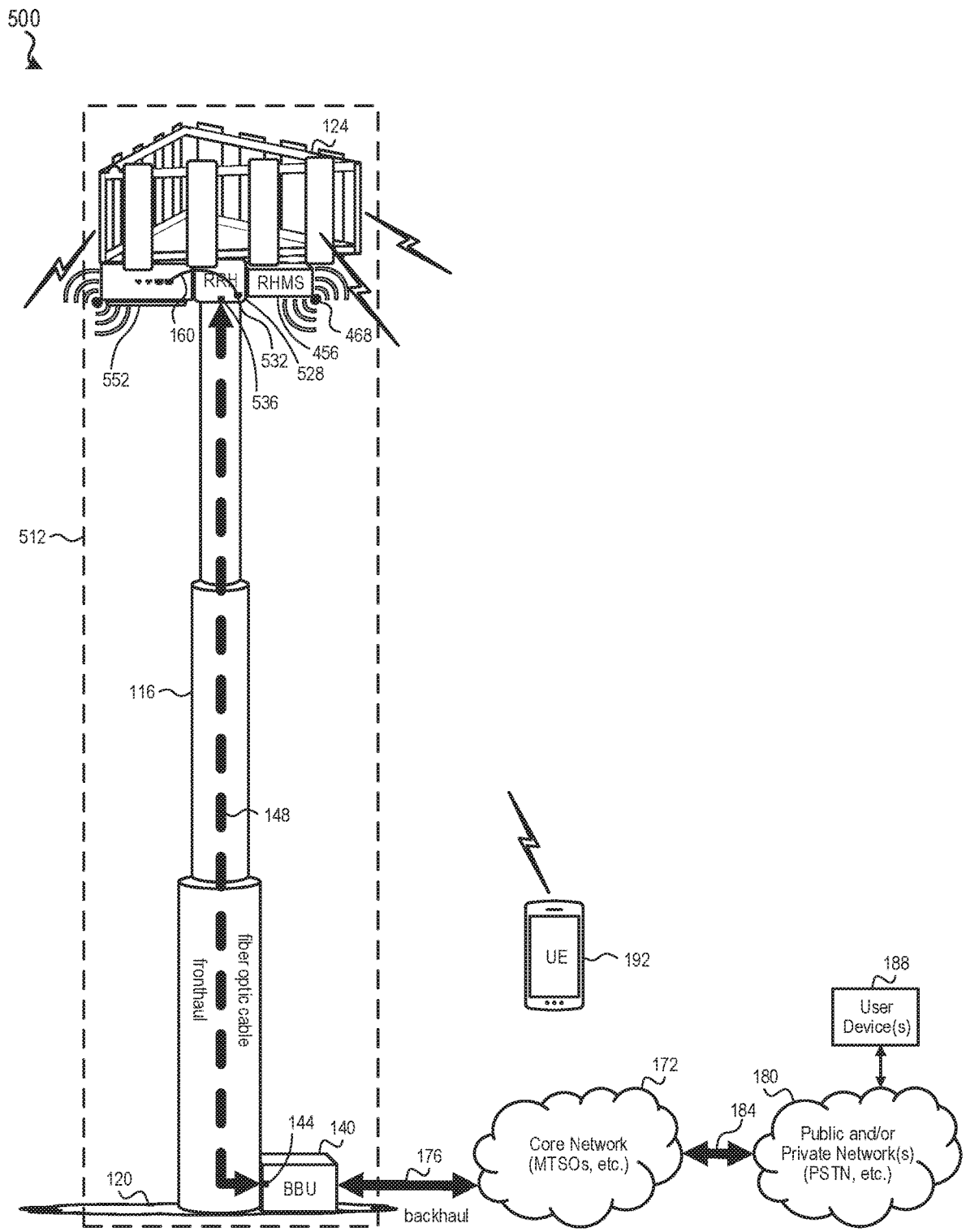
FIG. 5 depicts a cell-site monitoring system according to another embodiment of the disclosure.

The connector 430 is attached to the housing 420 such that connector 430 may be operably coupled to the RRH 528 (the RRH 528 is not depicted in FIG. 4, but see FIG. 5). More particularly, the connector 430 is attached to the housing 420 such that the connector 430 extends from the housing 420 as a male electrical coupling member (i.e., "an electrical plug"). And the antenna 468 extends from the housing 420 such that the antenna 468 may operably transmit and receive Wi-Fi signals.

The sensing module 436 is communicatively coupled to the central processing module 440. The central processing module 440 is communicatively coupled to the communication interface module 444. And the communication interface module 444 is communicatively coupled to the antenna 468. Additionally, the sensing module 436, the central processing module 440, and the communication interface module 444 are operably coupled to the connector 430 to receive power through the connector 430, and are configured to operate using that power. It should also be appreciated that the sensing module 436, the central processing module 440, and the communication interface module 444 may be implemented using an embodiment of the computer system 1280 (the computer system 1180 is not depicted in FIG. 4, but see FIG. 11). For example, in such embodiments the sensing module 436 may comprise a suitable one or more of the I/O devices 1190, the central processing module 440 may comprise a suitable one or more of the CPU 1182, the secondary storage 1184, the ROM 1186, and the RAM 188, and the communication interface module 444 may comprise a suitable one or more of the network connectivity devices 1192.

FIG. 5 depicts a cell-site monitoring system 500 according to another embodiment of the disclosure. It should be appreciated that the system 500 and/or one or more components thereof may be configured to, among other things, perform one or more steps of the method 1000 (see FIG. 10) for cell-site monitoring according to an embodiment of the disclosure. The system 500 is configured like the system 100 (described above in connection with FIG. 1), except that the system 500 includes an alternative cell site 512 (rather than the cell site 112). The cell site 512 includes (rather than the switch 152 and the RHMS 156) an IEEE 802.3af and IEEE 802.11ac compliant PoE power-receiving Wi-Fi enabled access point ("WAP") 552 and the Wi-Fi RHMS 456, respectively. In the illustrated system 500, the WAP 552 comprises a UniFi® AC AP Model UAP-AC-PRO Indoor/Outdoor Dual-Radio Access Point (which has been marketed by Ubiquiti Networks, Inc. at https://www.ui.com/unifi/unifi-ap-ac-outdoor/ and https://dl.ubnt.com/datasheets/unifi/UniFi_AC_APs_DS.pdf) (copies of these web pages have been archived on the Wayback Machine, https://web.archive.org/). In other embodiments, the WAP 552 may comprise any other suitable commercially available or specially manufactured device or equipment.

The cell site 512 also includes (rather than the RRH 128) a remote radio head ("RRH") 528. The RRH 528 includes a PoE+ power-sourcing Ethernet port 532 and an optical port 536. The Ethernet cable 160 operably couples the WAP 552 to the RRH 528 in a known manner, while the WAP 552 and the Wi-Fi RHMS 456 are Wi-Fi wirelessly communicatively coupled in a known manner. Further, the RRH 528 is configured to mate with the connector 430 (the connector 430 is described above in connection with FIG. 4) such that the connector 430 plugs into the RRH 528, and the RRH 528 is configured to provide sufficient power to the connector 430 for operating the Wi-Fi RHMS 456. The RRH 528 is also configured to provide, in addition to conventional remote radio head functionality, a communication gateway between the Ethernet port 532 and the optical port 536. In the illustrated system 500, the fiber-optic-cable-based fronthaul 148 extends between the optical port 536 (of the RRH 528) and the optical port 144 (of the BBU 140) to operably couple the RRH 528 to the BBU 140 in a known manner, and the RRH 528 and the BBU 140 are configured to communicate with each other over an O&M channel according to the CPRI protocol. In other embodiments, the RRH 528 and the BBU 140 may be configured to communicate with each other over an O&M channel according to the OBSAI protocol. In other embodiments, the fiber-optic-cable-based fronthaul 148 may support any suitable alternative communication protocol(s) and the RRH 528 and the BBU 140 may be configured to communicate pursuant to such protocol(s). In other embodiments, the fiber-optic-cable-based fronthaul 148 may be replaced with a coaxial-cable-based fronthaul, a wireless-communication-based fronthaul, and/or any other suitable alternative fronthaul implementation that supports CPRI, OBSAI, and/or any other suitable alternative communication protocol(s), and the RRH 528 and the BBU 140 may be configured to communicatively couple to any such fronthaul and communicate with each other according to any such protocol(s). It should be appreciated, then, that the RRH 528 also provides a communication gateway between the Wi-Fi RHMS 456 and the BBU 140.

Figure 6:
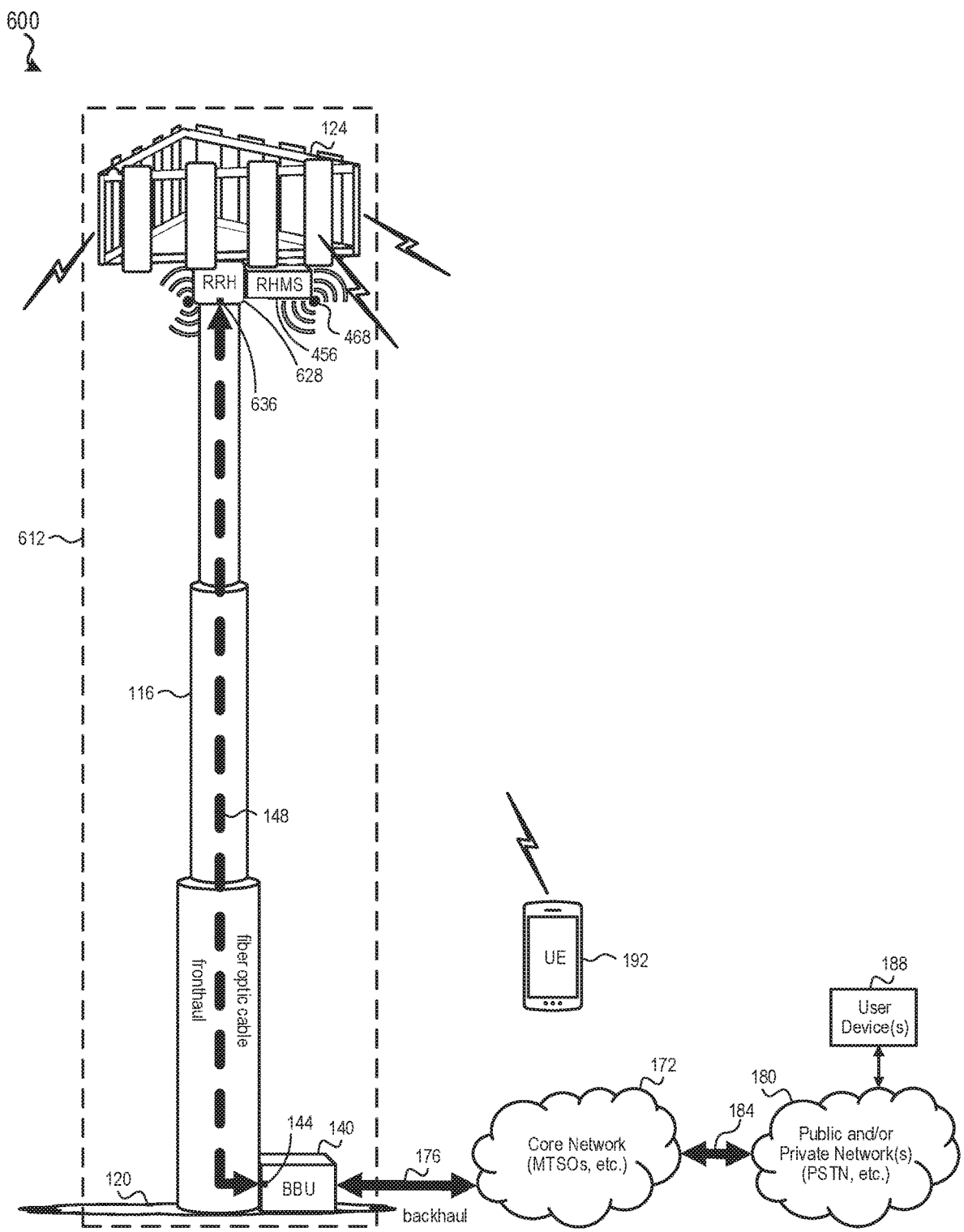
FIG. 6 depicts a cell-site monitoring system according to another embodiment of the disclosure.

FIG. 6 depicts a cell-site monitoring system 600 according to another embodiment of the disclosure. It should be appreciated that the system 600 and/or one or more components thereof may be configured to, among other things, perform one or more steps of the method 1000 (see FIG. 10) for cell-site monitoring according to an embodiment of the disclosure. The system 600 is configured like the system 500 (described above in connection with FIG. 5), except that the system 600 includes an alternative cell site 612 (rather than the cell site 512). The cell site 612 includes (rather than the RRH 528 and the separate WAP 552) an IEEE 802.11ac compliant remote radio head ("RRH") 628. The RRH 628 is configured to mate with the connector 430 of the Wi-Fi RHMS 456 (the Wi-Fi RHMS 456 is described above in connection with FIG. 4) such that the connector 430 plugs into the RRH 628, and the RRH 628 is configured to provide sufficient power to the connector 430 for operating the Wi-Fi RHMS 456. Additionally, the RRH 628 and the Wi-Fi RHMS 456 are Wi-Fi wirelessly communicatively coupled in a known manner. The RRH 628 also includes an optical port 636. The RRH 628 is configured to provide, in addition to conventional remote radio head functionality, a communication gateway between Wi-Fi communications of the RRH 628 and the optical port 636 of the RRH 628. In the illustrated system 600, the fiber-optic-cable-based fronthaul 148 extends between the optical port 636 (of the RRH 628) and the optical port 144 (of the BBU 140) to operably couple the RRH 628 to the BBU 140 in a known manner. In the illustrated system 600, the RRH 628 and the BBU 140 are configured to communicate with each other over an O&M channel according to the CPRI protocol. In other embodiments, the RRH 628 and the BBU 140 may be configured to communicate with each other over an O&M channel according to the OBSAI protocol. In other embodiments, the fiber-optic-cable-based fronthaul 148 may support any suitable alternative communication protocol(s) and the RRH 628 and the BBU 140 may be configured to communicate with each other pursuant to such protocol(s). In other embodiments, the fiber-optic-cable-based fronthaul 148 may be replaced with a coaxial-cable-based fronthaul, a wireless-communication-based fronthaul, and/or any other suitable alternative fronthaul implementation that supports CPRI, OBSAI, and/or any other suitable alternative communication protocol(s), and the RRH 628 and the BBU 140 may be configured to communicatively couple to any such fronthaul and communicate with each other according to any such protocol(s). It should be appreciated, then, that the RRH 628 also provides a communication gateway between the Wi-Fi RHMS 456 and the BBU 140.

Figure 7:
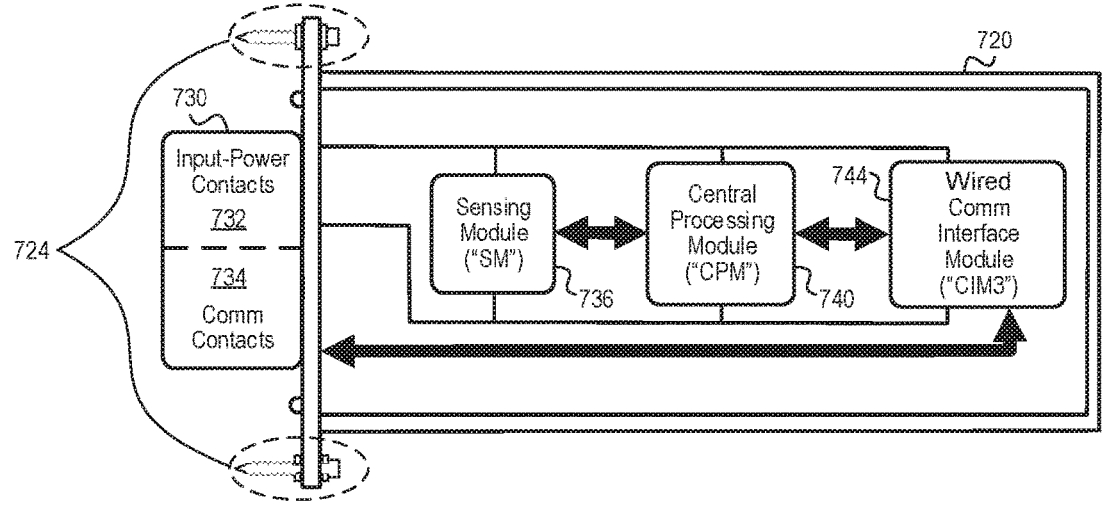
FIG. 7 depicts a layout for a non-PoE non-wirelessly-communicative radio-head-mounted sensor according to an embodiment of the disclosure.

FIG. 7 depicts a layout for a non-PoE non-wirelessly-communicative radio-head-mounted sensor ("non-PoE non-Wi-Fi RHMS") 756 according to an embodiment of the disclosure. It should be appreciated that the non-PoE non-Wi-Fi RHMS 756 and/or one or more components thereof may be configured to, among other things, perform one or more steps of the method 1000 (see FIG. 10) for cell-site monitoring according to an embodiment of the disclosure. In some embodiments, the non-PoE non-Wi-Fi RHMS 756 may be implemented as a suitable off-the-shelf non-PoE IoT device. In other embodiments, the non-PoE non-Wi-Fi RHMS 756 may be implemented as described further herein and/or using any other suitable device or combination of devices. The non-PoE non-Wi-Fi RHMS 756 includes: a housing 720; mounting hardware 724; an input-power and communication connector 730; a sensing module 736; a central processing module 740; and a communication interface module 744.

The housing 720 is configured to be securely attached to a RRH 828 (the RRH 828 is not depicted in FIG. 7, but see FIG. 8) by the mounting hardware 724. The housing 720 is also configured to meet or exceed National Electrical Manufacturers Association ("NEMA") level 4 electrical enclosure standards and to meet or exceed IEEE 1613 environmental and testing requirements. The housing 720 accommodates the sensing module 736, the central processing module 740, and the communication interface module 744 such that the sensing module 736 may operably sense one or more environmental parameters.

Figure 8:
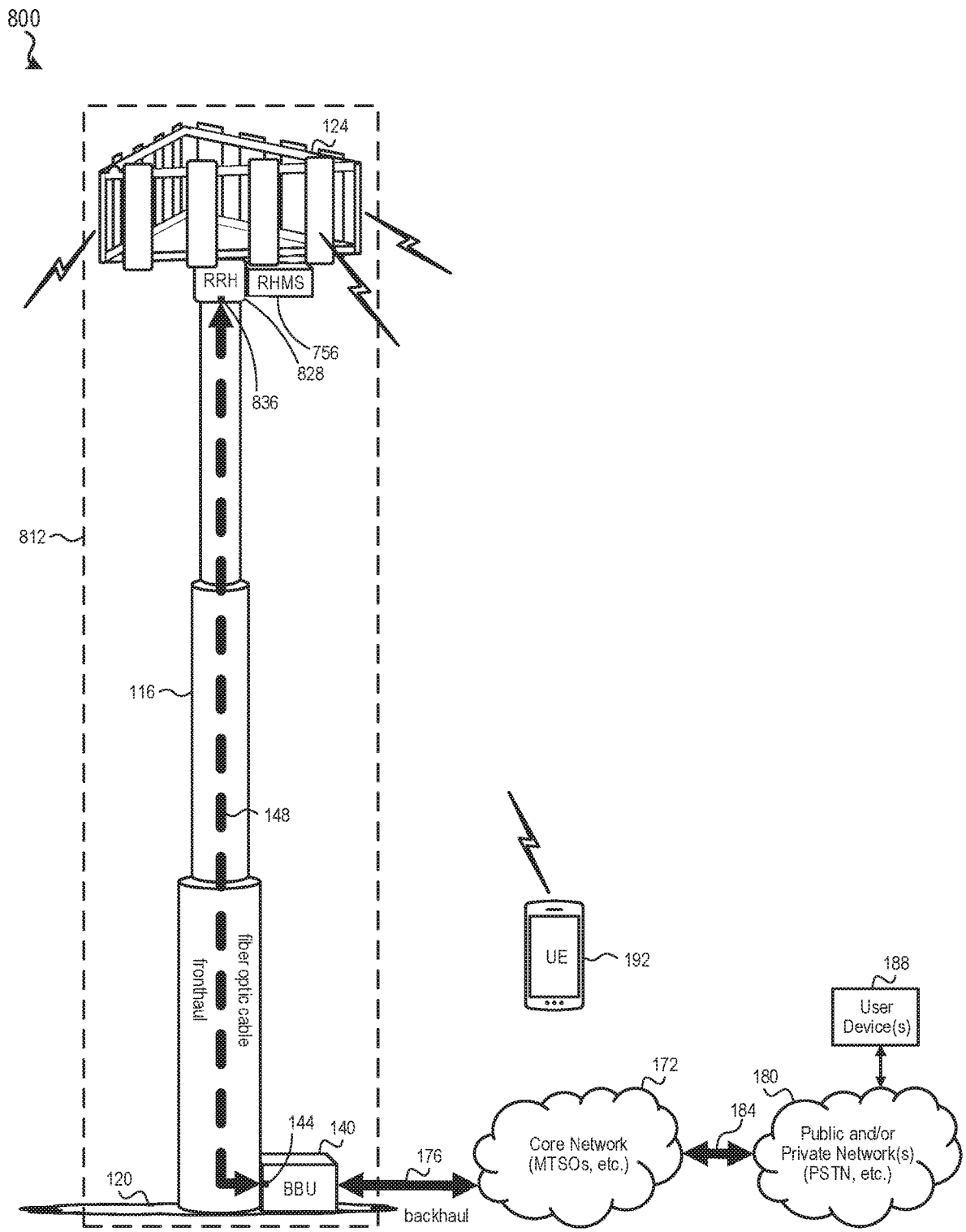
FIG. 8 depicts a cell-site monitoring system according to another embodiment of the disclosure.

The connector 730 includes input-power contacts 732 and communication contacts 734, and is attached to the housing 720 such that connector 730 may be operably coupled to the RRH 828 (the RRH 828 is not depicted in FIG. 7, but see FIG. 8). More particularly, the connector 730 is attached to the housing 720 such that connector 730 extends from the housing 720 as a male coupling member (i.e., "a plug").

The sensing module 736 is communicatively coupled to the central processing module 740, and the central processing module 740 is communicatively coupled to the communication interface module 744. Additionally, the sensing module 736, the central processing module 740, and the communication interface module 744 are operably coupled to the contacts 732 (of the connector 730) to receive power through the contacts 732 (and, thus, through the connector 730), and are configured to operate using that power. It should also be appreciated that the sensing module 736, the central processing module 740, and the communication interface module 744 may be implemented using an embodiment of the computer system 1180 (the computer system 1180 is not depicted in FIG. 7, but see FIG. 11). For example, in such embodiments the sensing module 736 may comprise a suitable one or more of the I/O devices 1190, the central processing module 740 may comprise a suitable one or more of the CPU 1182, the secondary storage 1184, the ROM 1186, and the RAM 1188, and the communication interface module 744 may comprise a suitable one or more of the network connectivity devices 1192.

FIG. 8 depicts a cell-site monitoring system 800 according to another embodiment of the disclosure. It should be appreciated that the system 800 and/or one or more components thereof may be configured to, among other things, perform one or more steps of the method 1000 (see FIG. 10) for cell-site monitoring according to an embodiment of the disclosure. The system 800 is configured like the system 600 (described above in connection with FIG. 6), except that the system 800 includes an alternative cell site 812 (rather than the cell site 612). The cell site 812 includes (rather than the Wi-Fi RHMS 456 and the RRH 628) the non-PoE non-Wi-Fi RHMS 756 (see also FIG. 7) and a non-wirelessly communicative and non-PoE remote radio head ("RRH") 828. The RRH 828 is configured to mate with the connector 730 of the non-PoE non-Wi-Fi RHMS 756 (the non-PoE non-Wi-Fi RHMS 756 is described above in connection with FIG. 7) such that the connector 730 plugs into the RRH 828, and the RRH 828 is configured to provide sufficient power to the contacts 732 of the connector 730 for operating the non-PoE non-Wi-Fi RHMS 756. Additionally, the RRH 828 and the non-PoE non-Wi-Fi RHMS 756 are configured to communicate with each (through the communication contacts 734) according to any suitable protocol (non-limiting examples of which being RS-232, RS-422, universal serial bus ("USB"), Ethernet, CPRI, and OBSAI) and are accordingly communicatively coupled (through the communication contacts 734) in a known manner. The RRH 828 also includes an optical port 836. The RRH 828 is configured to provide, in addition to conventional remote radio head functionality, a communication gateway between the non-PoE non-Wi-Fi RHMS 756 and the optical port 836.

In the illustrated system 800, the fiber-optic-cable-based fronthaul 148 extends between the optical port 836 (of the RRH 828) and the optical port 144 (of the BBU 140) to operably couple the RRH 828 to the BBU 140 in a known manner. In the illustrated system 800, the RRH 828 and the BBU 140 are configured to communicate with each other over an O&M channel according to the CPRI protocol. In other embodiments, the RRH 828 and the BBU 140 may be configured to communicate with each other over an O&M channel according to the OBSAI protocol. In other embodiments, the fiber-optic-cable-based fronthaul 148 may support any suitable alternative communication protocol(s) and the RRH 828 and the BBU 140 may be configured to communicate with each other pursuant to such protocol(s). In other embodiments, the fiber-optic-cable-based fronthaul 148 may be replaced with a coaxial-cable-based fronthaul, a wireless-communication-based fronthaul, and/or any other suitable alternative fronthaul implementation that supports CPRI, OBSAI, and/or any other suitable alternative communication protocol(s), and the RRH 828 and the BBU 140 may be configured to communicatively couple to any such fronthaul and communicate with each other according to any such protocol(s). It should be appreciated, then, that the RRH 128 also provides a communication gateway between the non-PoE non-Wi-Fi RHMS 756 and the BBU 140.

Figure 9:
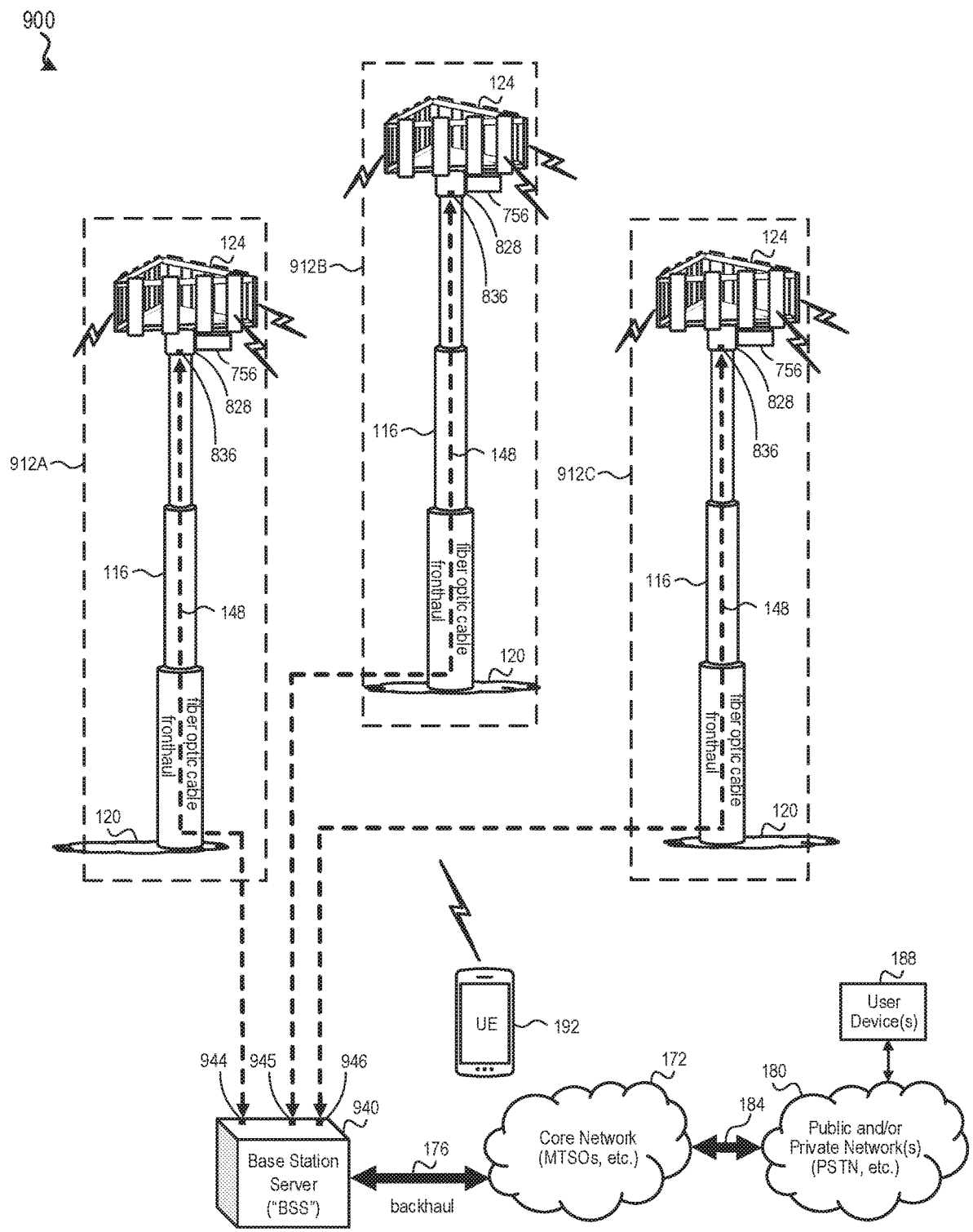
FIG. 9 depicts a cell-site monitoring system according to another embodiment of the disclosure.

FIG. 9 depicts a cell-site monitoring system 900 according to another embodiment of the disclosure. It should be appreciated that the system 900 and/or one or more components thereof may be configured to, among other things, perform one or more steps of the method 1000 (see FIG. 10) for cell-site monitoring according to an embodiment of the disclosure. The system 900 is configured like the system 800 (described above in connection with FIG. 8), except that the system 900 includes a BSS 940 (rather than the BBU 140) and includes (rather than the cell site 812) an alternative cell site 912A, an alternative cell site 912B, and an alternative cell site 912C. The cell site 912C is configured like the cell site 912B, which is configured like the cell site 912A, which is configured like the cell site 812 (described above in connection with FIG. 8), except that the BBU 140 is omitted. Thus, each of the cell sites 912A, 912B, and 912C includes a respective one of the RRH 828, which includes a respective one of the optical port 836. The BSS 940 includes an optical port 944, an optical port 945, and an optical port 946. The fiber-optic-cable-based fronthaul 148 (of the cell site 912A) communicatively couples the optical port 836 (of the RRH 828 of the cell site 912A) to the optical port 944 in a known manner. The fiber-optic-cable-based fronthaul 148 (of the cell site 912B) communicatively couples the optical port 836 (of the RRH 828 of the cell site 912B) to the optical port 945 in a known manner. And the fiber-optic-cable-based fronthaul 148 (of the cell site 912C) communicatively couples the optical port 836 (of the RRH 828 of the cell site 912C) to the optical port 946 in a known manner. It should be appreciated, then, that each RRH 828 provides, among other things, a communication gateway between the BSS 940 and the respective one of the non-PoE non-Wi-Fi RHMS 756.

Each fiber-optic-cable-based fronthaul 148 is suitable to support CPRI communication and/or OBSAI communication. In the illustrated system 900, each RRH 828 and the BSS 940 are configured to communicate with each other over an O&M channel according to the CPRI protocol. In other embodiments, each RRH 128 and the BSS 940 may be configured to communicate with each other over an O&M channel according to the OBSAI protocol. In other embodiments, any fiber-optic-cable-based fronthaul 148 may support any suitable alternative communication protocol(s), and each respective RRH 128 and the BSS 940 may be configured to communicate with each other according to such protocol(s). In other embodiments, any fiber-optic-cable-based fronthaul 148 may be replaced with a coaxial-cable-based fronthaul, a wireless-communication-based fronthaul, and/or any other suitable alternative fronthaul implementation that supports CPRI, OBSAI, and/or any other suitable alternative communication protocol(s), and each respective RRH 128 and the BSS 940 may be configured to communicatively couple to any such fronthaul and communicate with each other according to any such protocol(s).

Figure 10:
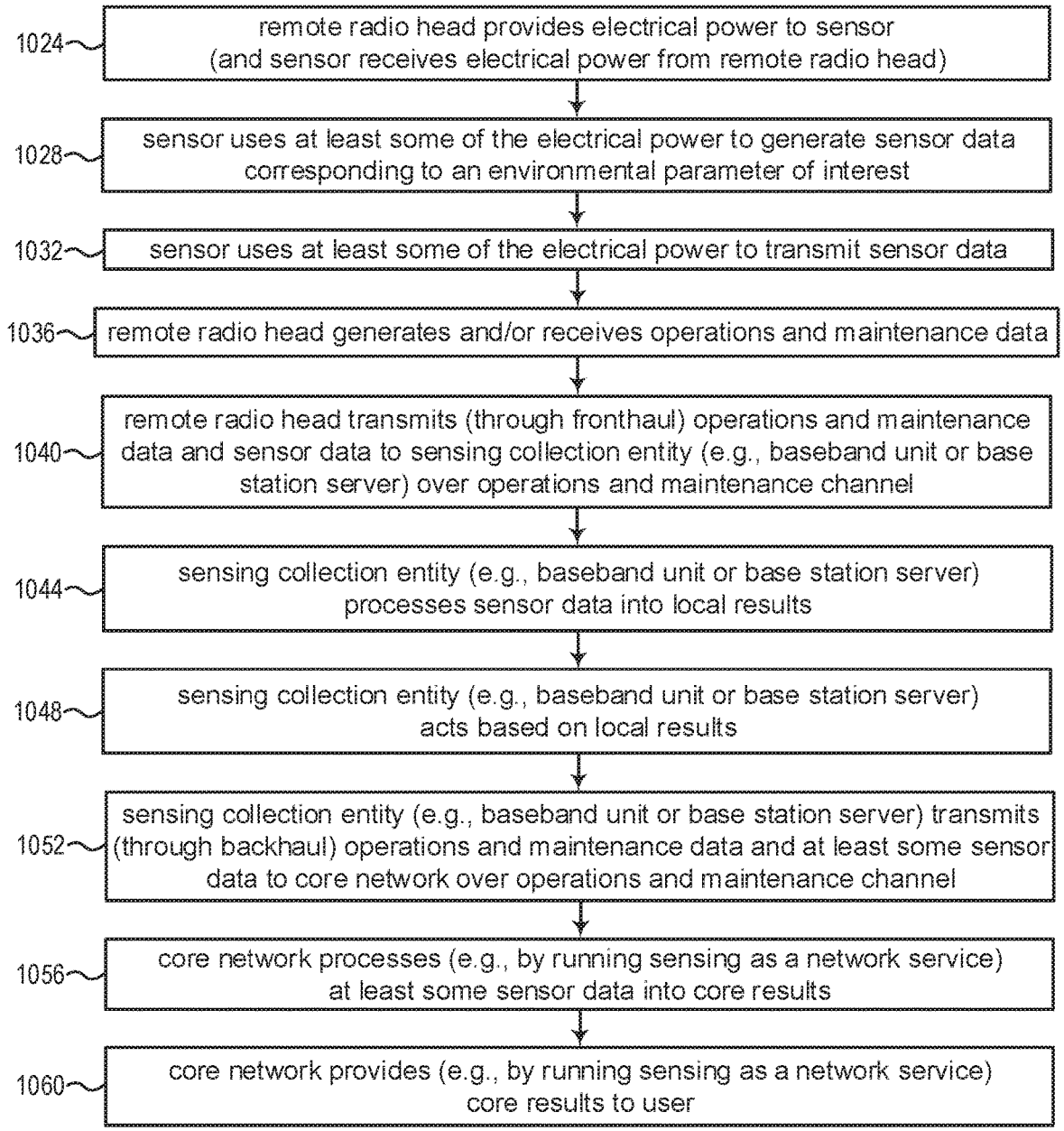
FIG. 10 is a flow chart of a method for cell-site monitoring according to an embodiment of the disclosure.

FIG. 10 is a flow chart of a method 1000 for cell-site monitoring according to an embodiment of the disclosure. The method 1000 may be performed by the system 900 (see FIG. 9). Accordingly, the following description of the method 1000 is made with reference to operations and components of the system 900. Nevertheless, it should be appreciated that the method 1000 and/or any one or more of the particular steps of the method 1000 may be performed by any other suitable device or system.

At step 1024, a remote radio head provides electrical power ("Operating Power") to a sensor (and the sensor receives the Operating Power from the remote radio head). For example, in some embodiments the RRH 828 of the cell site 912A (see FIG. 9) may provide Operating Power to the non-PoE non-Wi-Fi RHMS 756 of the cell site 912A (see FIG. 9) through the contacts 732 of the connector 730 (see FIG. 7). It should be appreciated that the RRH 828 may be powered by a corresponding power supply (not shown) in a known manner. After step 1024, operations of the system 900 go to step 1028 (described further below).

At step 1028, the sensor uses at least some of the Operating Power to generate sensor data corresponding to an environmental parameter of interest. For example, in some embodiments the non-PoE non-Wi-Fi RHMS 756 of the cell site 912A may measure the RF noise level, temperature, humidity, wind speed, carbon dioxide ("$CO_2$") concentration level, ozone ("$O_3$") concentration level, volatile organic chemical ("VOC") concentration level, and/or air particulate matter, etc. around the non-PoE non-Wi-Fi RHMS 756 and generate corresponding sensor data. After step 1028, operations of the system 900 go to step 1032 (described further below).

At step 1032, the sensor uses at least some of the Operating Power to transmit the sensor data. For example, in some embodiments the non-PoE non-Wi-Fi RHMS 756 of the cell site 912A may transmit the sensor data to the RRH 828 of the cell site 912A (see FIG. 9) through the contacts 734 of the connector 730 (see FIG. 7). After step 1032, operations of the system 900 go to step 1036 (described further below).

At step 1036, the remote radio head generates and/or receives operations and maintenance data. For example, in some embodiments the RRH 828 of the cell site 912A may run diagnostics on the array antenna 124 of the cell site 912A and generate corresponding operations and maintenance data in a known manner. After step 1036, operations of the system 900 go to step 1040 (described further below).

At step 1040, the remote radio head transmits (through a fronthaul) the operations and maintenance data and the sensor data to a sensing collection entity (e.g., baseband unit or base station server) over an O&M channel. For example, in some embodiments the RRH 828 of the cell site 912A may transmit (through the fiber-optic-cable-based fronthaul 148) the operations and maintenance data and the sensor data to the BSS 940 over an O&M channel. After step 1040, operations of the system 900 go to step 1044 (described further below).

At step 1044, the sensing collection entity (e.g., baseband unit or base station server) processes the sensor data into local results. For example, in some embodiments the BSS 940 may receive (through the optical ports 944, 945, and 946) RF noise data from each respective cell site 912A, 912B, and 912C (where each of the cell sites 912A, 912B, and 912C covers a respective cellular communications sector) and may process the RF noise data into a determination of which cell sector has the relatively highest RF noise level. After step 1044, operations of the system 900 go to step 1048 (described further below).

At step 1048, the sensing collection entity (e.g., baseband unit or base station server) acts based on the local results (generated at step 1044). For example, in some embodiments the BSS 940 may (based on which cell sector has the relatively highest RF noise level) transmit operations data to a plurality of the RRH 828 that causes the plurality of the RRH 828 to dynamically adjust the beam width and/or direction, etc. of a respective plurality of the array antenna 124 so as to join capabilities of a plurality of the array antenna 124 for providing better service to UE 192 located in a sector having a high noise level. Or, for example, the BSS 940 may transmit operations data to one or more of the RRH 828 that causes an inter-cell handover (i.e., a sector transfer) of communications with one or more of the UE 192. Or, for example, in some embodiments the BSS 940 may (when an RF noise level, temperature, humidity, wind speed, carbon dioxide ("$CO_2$") concentration level, ozone ("$O_3$") concentration level, volatile organic chemical ("VOC") concentration level, particulate matter level, or other parameter represented by the local results exceeds or drops below a threshold) sound an alarm or cause another device to sound an alarm. After step 1048, operations of the system 900 go to step 1052 (described further below).

At step 1052, the sensing collection entity (e.g., baseband unit or base station server) transmits (through the backhaul 176) operations and maintenance data and at least some of the sensor data to the core network over an operations and maintenance channel. After step 1052, operations of the system 900 go to step 1056 (described further below).

At step 1056, the core network processes (e.g., by running sensing as a network service) at least some sensor data (transmitted to the core network at step 1052) into core results. For example, in some embodiments the BSS 940 may (at step 1052) transmit (through the backhaul 176) operations and maintenance data and some data from a particulate matter (e.g., PM2.5) sensor to the core network 172 over an operations and maintenance channel, and the core network 172 may (at step 1056) process the PM2.5 data into one or more graphical, tabular, etc. representations of cumulative or instantaneous PM2.5 readings versus time. It should be appreciated that in some embodiments step 1056 may be performed as part of a SAaNS. After step 1056, operations of the system 900 go to step 1060 (described further below).

At step 1060, the core network provides (e.g., by running sensing as a network service) core results to a user. For example, in some embodiments the core network 172 may provide the core results to a user through the one or more additional communication links 184, the one or more public and/or private networks 180, and the one or more user devices 188. It should also be appreciated that in some embodiments step 1060 may be performed as part of a SAaNS.

Figure 11:
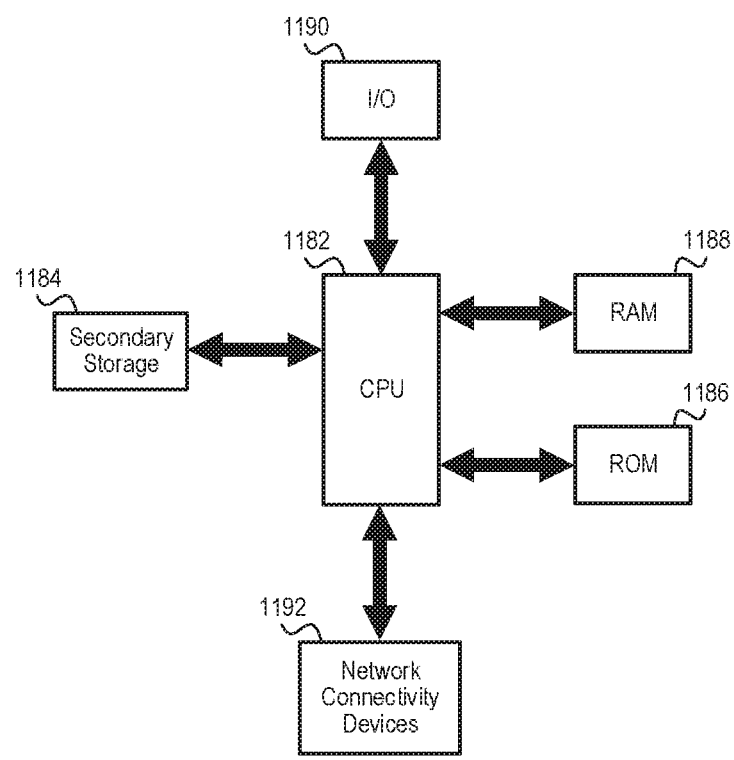
FIG. 11 is a block diagram of a computer system suitable for implementing one or more embodiments disclosed herein.

FIG. 11 is a block diagram of a computer system 1180 suitable for implementing one or more embodiments disclosed herein. The computer system 1180 includes a processor 1182 (which may be referred to as a "central processor unit," "central processing unit," or "CPU") that is in communication with memory devices including secondary storage 1184, read only memory ("ROM") 1186, random access memory ("RAM") 1188, input/output ("I/O") devices 1190, and network connectivity devices 1192. The processor 1182 may be implemented as one or more integrated circuit ("IC") chips. It is understood that by programming and/or loading executable instructions onto the computer system 1180, at least one of the CPU 1182, the RAM 1188, and the ROM 1186 are changed, transforming the computer system 1180 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit ("ASIC"), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 1180 is turned on or booted, the CPU 1182 may execute a computer program or application. For example, the CPU 1182 may execute software or firmware stored in the ROM 1186 or stored in the RAM 1188. In some cases, on boot and/or when the application is initiated, the CPU 1182 may copy the application or portions of the application from the secondary storage 1184 to the RAM 1188 or to memory space within the CPU 1182 itself, and the CPU 1182 may then execute instructions that the application is comprised of. In some cases, the CPU 1182 may copy the application or portions of the application from memory accessed via the network connectivity devices 1192 or via the I/O devices 1190 to the RAM 1188 or to memory space within the CPU 1182, and the CPU 1182 may then execute instructions that the application is comprised of. During execution, an application may load instructions into the CPU 1182, for example load some of the instructions of the application into a cache of the CPU 1182. In some contexts, an application that is executed may be said to configure the CPU 1182 to do something, e.g., to configure the CPU 1182 to perform the function or functions promoted by the subject application. When the CPU 1182 is configured in this way by the application, the CPU 1182 becomes a specific purpose computer or a specific purpose machine.

The secondary storage 1184 is typically comprised of one or more disk drives or tape drives and is used for non-volatile storage of data and as an over-flow data storage device if RAM 1188 is not large enough to hold all working data. Secondary storage 1184 may be used to store programs which are loaded into RAM 1188 when such programs are selected for execution. The ROM 1186 is used to store instructions and perhaps data which are read during program execution. ROM 1186 is a non-volatile memory device which typically has a small memory capacity relative to the larger memory capacity of secondary storage 1184. The RAM 1188 is used to store volatile data and perhaps to store instructions. Access to both ROM 1186 and RAM 1188 is typically faster than to secondary storage 1184. The secondary storage 1184, the RAM 1188, and/or the ROM 1186 may be referred to in some contexts as computer readable storage media and/or non-transitory computer readable media.

The I/O devices 1190 may include digital sensors, printers, video monitors, liquid crystal displays ("LCDs"), touch screen displays, keyboards, keypads, switches, dials, mice, track balls, voice recognizers, card readers, paper tape readers, and/or other well-known input devices and/or other well-known output devices. Non-limiting examples of digital sensors include those marketed by Sensirion Inc., 11 East Adams, Suite 220, Chicago, Ill. 60603, at www.sensirion.com (a copy of this web page has been archived on the Wayback Machine, https://web.archive.org/), and RF Explorer 3G+ IoT modules (manufactured by Seeed Technology Co., Ltd) marketed by Digi-Key Electronics at https://www.digikey.com/catalog/en/partgroup/rf-explorer-3g-iot-shield-for-arduino/65956?mpart=114990813&vendor=1597 (a copy of this web page has been archived on the Wayback Machine, https://web.archive.org/).

The network connectivity devices 1192 may take the form of modems, modem banks, Ethernet cards, universal serial bus ("USB") interface cards, serial interfaces, token ring cards, fiber distributed data interface ("FDDI") cards, wireless local area network ("WLAN") cards, radio transceiver cards that promote radio communication using protocols such as code division multiple access ("CDMA"), global system for mobile communication ("GSM"), long-term evolution ("LTE"), worldwide interoperability for microwave access ("WiMAX"), near field communication ("NFC"), radio frequency identity ("RFID), and/or other air interface protocol radio transceiver cards, and other well-known network devices. These network connectivity devices 1192 may enable the processor 1182 to communicate with the Internet or one or more intranets. With such a network connection, it is contemplated that the processor 1182 might receive information from the network, or might output information to the network in the course of performing the method steps described herein. Such information, which is often represented as a sequence of instructions to be executed using processor 1182, may be received from and outputted to the network, for example, in the form of a computer data signal embodied in a carrier wave.

Such information, which may include data or instructions to be executed using processor 1182 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 1182 executes instructions, codes, computer programs, scripts which it accesses from hard disk, floppy disk, optical disk (these various disk based systems may all be considered secondary storage 1184), flash drive, ROM 1186, RAM 1188, or the network connectivity devices 1192. While only one processor 1182 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1184, for example, hard drives, floppy disks, optical disks, and/or other device, the ROM 1186, and/or the RAM 1188 may be referred to in some contexts as non-transitory instructions and/or non-transitory information.

In an embodiment, the computer system 1180 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1180 to provide the functionality of a number of servers that is not directly bound to the number of computers in the computer system 1180. For example, virtualization software may provide twenty virtual servers on four physical computers. In an embodiment, the functionality disclosed herein may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed herein may be provided as a computer program product. The computer program product may comprise one or more computer readable storage medium having computer usable program code embodied therein to implement the functionality disclosed herein. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory ("CD-ROM") disks, floppy disks, jump drives, digital cards, multimedia cards, and others. The computer program product may be suitable for loading, by the computer system 1180, at least portions of the contents of the computer program product to the secondary storage 1184, to the ROM 1186, to the RAM 1188, and/or to other non-volatile memory and volatile memory of the computer system 1180. The processor 1182 may process the executable instructions and/or data structures in part by directly accessing the computer program product, for example by reading from a CD-ROM disk inserted into a disk drive peripheral of the computer system 1180. Alternatively, the processor 1182 may process the executable instructions and/or data structures by remotely accessing the computer program product, for example by downloading the executable instructions and/or data structures from a remote server through the network connectivity devices 1192. The computer program product may comprise instructions that promote the loading and/or copying of data, data structures, files, and/or executable instructions to the secondary storage 1184, to the ROM 1186, to the RAM 1188, and/or to other non-volatile memory and volatile memory of the computer system 1180.

In some contexts, the secondary storage 1184, the ROM 1186, and the RAM 1188 may be referred to as a non-transitory computer readable medium or a computer readable storage media. A dynamic RAM embodiment of the RAM 1188, likewise, may be referred to as a non-transitory computer readable medium in that while the dynamic RAM receives electrical power and is operated in accordance with its design, for example during a period of time during which the computer system 1180 is turned on and operational, the dynamic RAM stores information that is written to it. Similarly, the processor 1182 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for sensing an environmental parameter at a cell site of a cellular communication network and transporting corresponding data over an operations and maintenance ("O&M") channel of the cellular communication network, the system comprising:
   a remote radio head; and
   a sensor operably coupled to the remote radio head to receive electrical power from the remote radio head and transmit sensor data corresponding to the environmental parameter to the remote radio head, wherein the sensor includes:
      a sensing module comprising one or more I/O devices, the sensing module operable to generate sensing module data corresponding to the environmental parameter,
      a central processing module comprising a central processing unit, the central processing module operably coupled to the sensing module to receive the sensing module data therefrom, operable to generate the sensor data corresponding to the sensing module data,
      a communication interface module comprising one or more network connectivity devices, the communication interface module operably coupled to the central processing module to receive the sensor data therefrom and operably coupled to the remote radio head to transmit the sensor data thereto,
a sensor housing accommodating the sensing module, the central processing module, and the communication interface module, and
a connector extending from the sensor housing, the connector being plugged into the remote radio head to receive the electrical power from the remote radio head, and the connector being operably coupled to at least one module selected from the group consisting of the sensing module, the central processing module, and the communication interface module to convey at least some of the electrical power to the at least one module,
wherein the sensor is operable to use at least some of the electrical power to generate the sensor data and is operable to use at least some of the electrical power to transmit the sensor data to the remote radio head, and
wherein the remote radio head is operable to provide the electrical power to the sensor, is operable to receive the sensor data, and is operable to transmit operations and maintenance data and the sensor data over the O&M channel.

2. The system of claim 1, wherein the sensor includes at least one module selected from the group consisting of a radio frequency ("RF") noise sensor module, a temperature sensor module, a humidity sensor module, a wind speed sensor module, a carbon dioxide ("$CO_2$") sensor module, an ozone ("03") sensor module, a volatile organic compounds sensor module, and a particulate matter sensor module.

3. The system of claim 2, further comprising at least one device selected from the group consisting of a baseband unit and a base station server, wherein the remote radio head provides a communication gateway between the sensor and the at least one device.

4. The system of claim 1, wherein the communication interface module is operably coupled to the remote radio head to wirelessly transmit the sensor data thereto.

5. The system of claim 4, wherein the sensor includes an Internet of Things device.

6. The system of claim 1, wherein the sensor includes at least one module selected from the group consisting of an RF noise sensor module, a temperature sensor module, a humidity sensor module, a wind speed sensor module, a carbon dioxide sensor module, an ozone sensor module, a volatile organic compounds sensor module, and a particulate matter sensor module.

7. The system of claim 6, further comprising at least one device selected from the group consisting of a baseband unit and a base station server, wherein the remote radio head provides a communication gateway between the sensor and the at least one device.

8. A method for sensing an environmental parameter at a cell site of a cellular communication network and transporting corresponding data over an operations and maintenance ("O&M") channel of the cellular communication network, the method comprising:
receiving electrical power provided by a remote radio head;
generating, by a sensor using at least some of the electrical power, sensor data corresponding to the environmental parameter, wherein the sensor includes:
a sensing module comprising one or more I/O devices, the sensing module operable to generate sensing module data corresponding to the environmental parameter,
a central processing module comprising a central processing unit, the central processing module operably coupled to the sensing module to receive the sensing module data therefrom, operable to generate the sensor data corresponding to the sensing module data,
a communication interface module comprising one or more network connectivity devices, the communication interface module operably coupled to the central processing module to receive the sensor data therefrom and operably coupled to the remote radio head to transmit the sensor data thereto,
a sensor housing accommodating the sensing module, the central processing module, and the communication interface module, and
a connector extending from the sensor housing, the connector being plugged into the remote radio head to receive the electrical power from the remote radio head, and the connector being operably coupled to at least one module selected from the group consisting of the sensing module, the central processing module, and the communication interface module to convey at least some of the electrical power to the at least one module;
transmitting, using at least some of the electrical power, the sensor data to the remote radio head; and
transmitting, from the remote radio head, over the O&M channel, operations and maintenance data and the sensor data.

9. The method of claim 8, wherein generating the sensor data includes generating the sensor data using at least one module selected from the group consisting of a radio frequency ("RF") noise sensor module, a temperature sensor module, a humidity sensor module, a wind speed sensor module, a carbon dioxide sensor module, an ozone sensor module, a volatile organic compounds sensor module, and a particulate matter sensor module.

10. The method of claim 9, wherein transmitting the sensor data to the remote radio head includes transmitting the sensor data from an Internet of Things device.

11. The method of claim 8, wherein receiving the electrical power provided by the remote radio head includes receiving the electrical power through an Ethernet cable, and transmitting the sensor data to the remote radio head includes transmitting the sensor data through the Ethernet cable.

12. The method of claim 11, wherein transmitting the sensor data through the Ethernet cable includes transmitting the sensor data from an Internet of Things device.

13. The method of claim 8, wherein transmitting the sensor data to the remote radio head includes wirelessly transmitting the sensor data to the remote radio head.

14. The method of claim 13, wherein transmitting the sensor data to the remote radio head includes transmitting the sensor data from an Internet of Things device.

15. The method of claim 8, further comprising:
processing at least some of the sensor data into first results using at least one device selected from the group consisting of a baseband unit and a base station server;
processing at least some of the sensor data into second results using a core network; and
providing at least some of the second results to a user.

16. A method for sensing an environmental parameter at a cell site of a cellular communication network and transporting corresponding data to a core network of the cellular communication network over an operations and maintenance ("O&M") channel of the cellular communication network, the method comprising:
  generating, using an Internet of Things sensor, sensor data corresponding to the environmental parameter, wherein the sensor includes:
    a sensing module comprising one or more I/O devices, the sensing module operable to generate sensing module data corresponding to the environmental parameter,
    a central processing module comprising a central processing unit, the central processing module operably coupled to the sensing module to receive the sensing module data therefrom, operable to generate the sensor data corresponding to the sensing module data,
    a communication interface module comprising one or more network connectivity devices, the communication interface module operably coupled to the central processing module to receive the sensor data therefrom and operably coupled to the remote radio head to transmit the sensor data thereto,
    a sensor housing accommodating the sensing module, the central processing module, and the communication interface module, and
    a connector extending from the sensor housing, the connector being plugged into the remote radio head to receive the electrical power from the remote radio head, and the connector being operably coupled to at least one module selected from the group consisting of the sensing module, the central processing module, and the communication interface module to convey at least some of the electrical power to the at least one module;
  wirelessly transmitting the sensor data from the Internet of Things sensor to a communication gateway module coupled to the remote radio head; and
  transmitting the sensor data from the communication gateway module to the core network over the O&M channel.

17. The method of claim 16, wherein transmitting the sensor data from the communication gateway module to the core network over the O&M channel includes transmitting the sensor data through a fronthaul.

18. The method of claim 17, wherein transmitting the sensor data through the fronthaul includes transmitting the sensor data to at least one device selected from the group consisting of a baseband unit and a base station server.

19. The method of claim 18, wherein generating the sensor data includes generating data representing a parameter selected from the group consisting of a radio frequency ("RF") noise level, a temperature, a humidity, a wind speed, a carbon dioxide ("$CO_2$") concentration level, an ozone ("$O_3$") concentration level, a volatile organic chemical ("VOC") concentration level, and a particulate matter level.

* * * * *